United States Patent [19]

Birt et al.

[11] 4,185,143

[45] Jan. 22, 1980

[54] WATER ACTIVATED BATTERIES

[75] Inventors: Dennis C. P. Birt, Bournemouth; Leonard J. Pearce, Broadstone, both of England

[73] Assignee: The Secretary of State for Defence in Her Britannic Majesty's Government of the United Kingdom of Great Britain and Northern Ireland, London, England

[21] Appl. No.: 880,513

[22] Filed: Feb. 23, 1978

[30] Foreign Application Priority Data

Feb. 23, 1977 [GB] United Kingdom ................. 7736/77

[51] Int. Cl.² ............................................ H01M 6/34
[52] U.S. Cl. ................................... 429/119; 429/213
[58] Field of Search ............... 429/118, 119, 213, 110, 429/149, 152, 72

[56] References Cited

U.S. PATENT DOCUMENTS

| | | | |
|---|---|---|---|
| 3,185,592 | 5/1965 | Kirk et al. | 429/119 |
| 3,884,720 | 5/1975 | Armstrong | 429/119 |
| 3,966,497 | 6/1976 | Honer | 429/119 |
| 4,020,247 | 4/1977 | Birt et al. | 429/119 |

*Primary Examiner*—Anthony Skapars
*Attorney, Agent, or Firm*—Pollock, VandeSande and Priddy

[57] ABSTRACT

In the cell of a water activated battery using a metal/organo-halogen couple wherein the anode and cathode are formed as planar members with a porous insulator sandwiched between there are provided channels to allow the electrolyte access throughout the cell. The channels may be cut in the cathode or the cathode may be formed as discrete portions of cathode reactant material deposited on a current collector backing plate.

8 Claims, 6 Drawing Figures

WATER ACTIVATED BATTERIES

This invention relates to water activated batteries and in particular to water activated batteries using metal/organo-halogen couples. More particularly but not exclusively the invention is directed to the design of low cost sea water activated primary reserve batteries for powering for example sonobuoys.

Conventionally the magnesium/silver chloride couple is used in such designs principally for its volumetric compactness. It is however relatively expensive particularly as in many applications the batteries are not recoverable.

Several metal/organo-halogen couples have energy density characteristics near equal to that of the magnesium/silver chloride system, although on a continuous duty cycle that are unable to sustain high discharge rates because of the relatively slow transport processes within the cathodes.

In many sonobuoy applications batteries operate continuously at low power levels whereas in other applications the batteries are required to operate in a high power pulse mode periodically for example one second in every ten seconds. A design of cell has been developed in which the cathode can sustain sufficiently high currents for short periods of time using organo-halogen reactants without concentration polarization becoming excessive.

It is an object of the present invention to provide a battery design based on metal/organo-halogen couples which is directly competitive with the magnesium/silver chloride couple and considerably cheaper to manufacture. According to the present invention a cell of a water activated battery employing a metal/organo-halogen couple has anode and cathode members of planar form with a porous insulating member sandwiched there-between, the cell including electrolyte access passageways through which in use electrolyte might be distributed through the cell structure. The electrolyte access passageways in their simplest form extend around the periphery of the cathode member whereby electrolyte flowing in the passageways can have access to the whole peripheral edge region of the cathode reactant material.

Additional electrolyte access passageways might conveniently be formed in the cathode reactant material itself, or, preferably the cathode reactant material might comprise at least two discrete spaced apart portions to provide an electrolyte access passageway between them. In cathodes of large planar area the discrete portions might be assembled in mosaic form with a network of inter-connecting electrolyte access passageways extending across and throughout the cathode reactant material. The cathode member would comprise the discrete portions of cathode reactant material mounted upon or arranged in direct contact with a single current collector backing plate. In this embodiment of the invention the cell of the battery is so constructed that in use the electrolyte has direct access to the peripheral edge regions of each discrete portion whereby rapid and uniform wetting of substantially the whole of the cathode reactant material can be achieved.

In an alternative embodiment the porous insulating member might form an effective electrolyte access passageway by providing in the planar anode member holes or shaped cut-outs to facilitate and increase the rate at which electrolyte can ingress into the cell and particularly into the cathode reactant material. Such perforated anodes can with advantage be employed in cells having only peripheral electrolyte access passageways or in cells having a combination of peripheral and internal, ie within or between the cathode reactant material, electrolyte access passageways.

In a battery design the cells are arranged in sandwich form and electrolyte might be admitted into the individual cells and the electrolyte access passageways therein via portways provided within the body of the battery casing.

The anode materials are preferably a magnesium alloy or an aluminum alloy and the cathode reactant materials dibromo-dimethyl-hydantoin or trichloroisocyanuric acid.

An embodiment of the invention will now be described by way of example only and with reference to the accompanying drawings in which.

Figure 1:
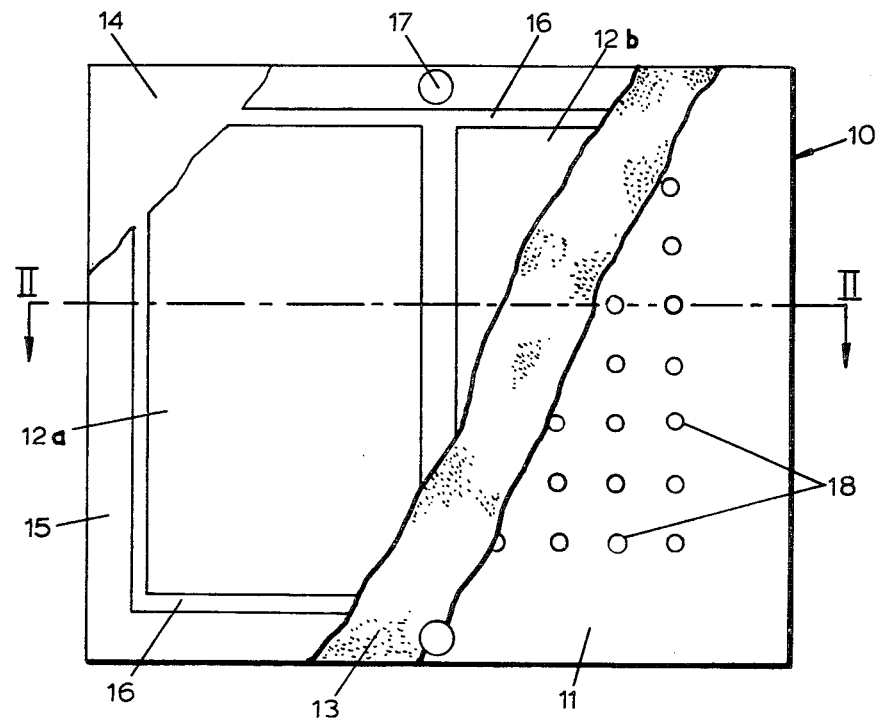
FIG. 1 illustrates schematically a part plan section of a cell of the invention.
Figure 2:
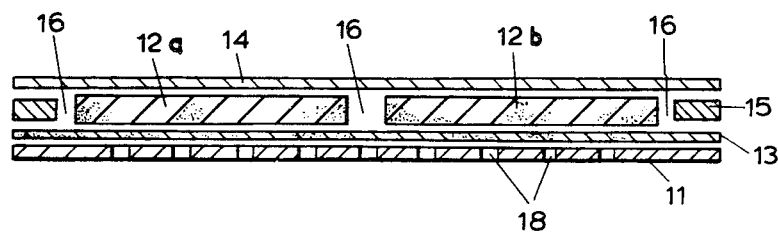
FIG. 2 is a section through the cell of FIG. 1 taken on the lines II—II.

FIGS. 1 and 2 illustrate a cell 10 having an anode member 11, cathode member 12 and sandwiched there-between a porous insulating membrane 13. The cathode member 12 comprises discrete portions 12a and 12b arranged relative to a current collector 14. The cathode reactant material might be mounted on the current collector 14 or arranged such that after assembly of the cell it is in direct contact with the current collector 14. A gasket 15 surrounds the cathode member 12 to create an electrolyte access passageway 16 between it and the cathode member 12. The electrolyte access passageway 16 is continued between the discrete portions 12a and 12b of the cathode member 12. In use the electrolyte access passageways 16 are fed with electrolyte via electrolyte portways 17.

The porous membrane 13 also acts as an electrolyte access passageway to feed electrolyte to the cathode member 12. However with the porous insulating membrane 13 sandwiched tightly between the anode 11 and the cathode reactant material 12 the ability of electrolyte to penetrate into the porous membrane 13 by means of natural absorption and capillary action is restricted to the peripheral edge regions of the membrane. It has been found that the provision in the planar anode member 11 of spaced apart cut-outs or holes 18 greatly reduces the resistance to penetration of the electrolyte into the porous insulating membrane 13. Natural penetration occurs between the peripheral edge of the membrane 13 and the anode cut-out 18 adjacent the edge of the anode 11 such that the anode cut-out 18 tends to serve as a local electrolyte reservoir from which further penetration of the electrolyte into the porous insulating membrane 13 is facilitated.

Figure 3:
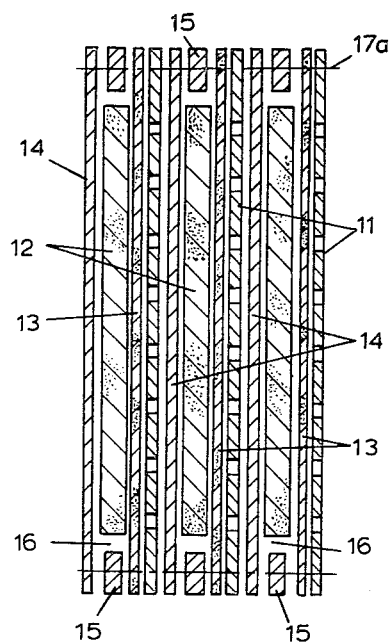
FIG. 3 illustrates schematically a three cell battery employing cells of the invention as illustrated in FIG. 1.

FIG. 3 shows schematically the main component parts of a three cell battery prior to assembly. The individual cells are stacked together and placed between two end plates (not shown) which are brought towards each other to compact the cells. It will be noted that prior to assembly the cathode reactant material 12 (either dibromo-dimethyl-hydantoin or trichloroisocyanuric acid) is thicker than the gasket 15. This is to allow for compaction of the cathode reactant material during assembly. Fabrication and necessary compaction of the organo-halogen materials is in accordance with established procedures. The location of the electrolyte portways 17 is indicated by the chain-dot line 17a.

Figure 5:
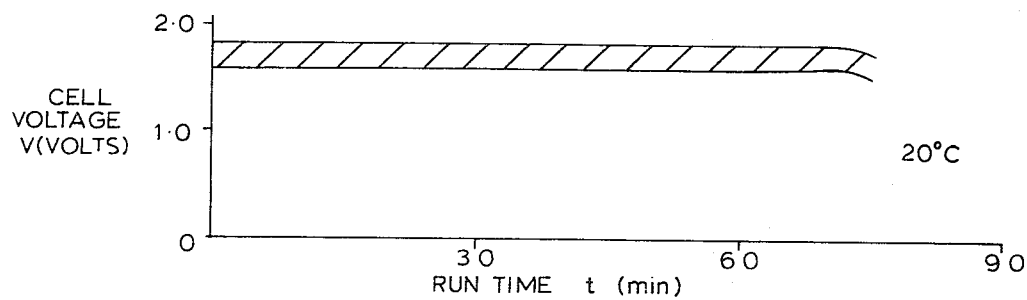
FIGS. 4 and 5 show the pulse performance of example cells operating at 0° C. and at room temperature respectively.
Figure 4:
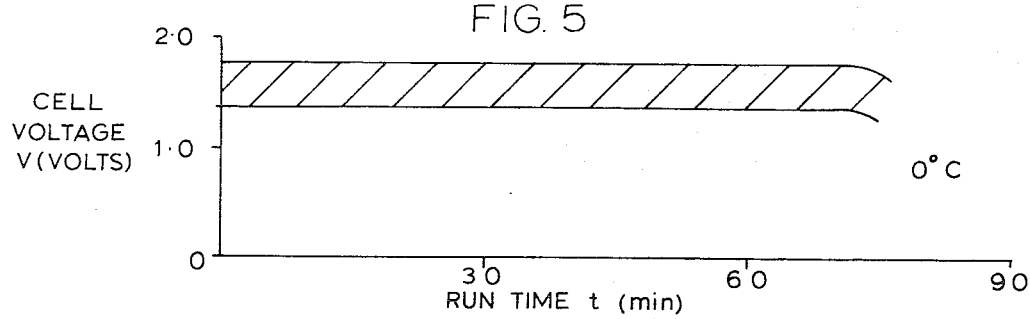
Figure 6:
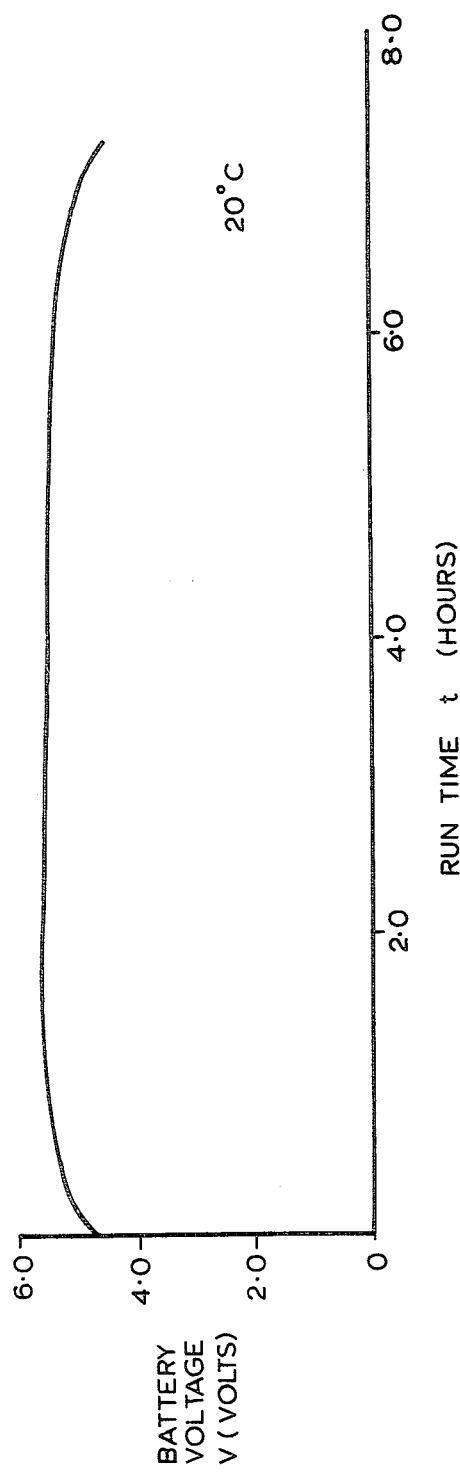
FIG. 6 shows the performance of a three cell battery operating at steady current.

The performance of compact cells in sea water electrolytes is shown in FIGS. 4, 5 and 6. The V-t envelope in FIGS. 4 and 5 illustrates the excellent characteristics that can be achieved for this type of cell when operated periodically in a high power pulse manner. These particular cells were designed to operate at high current densities for one second in every ten seconds over a period of an hour and a temperature range from 0° to 30° C. (1 second at 50 mA/cm$^2$ and 9 seconds at 5 mA/cm$^2$).

FIG. 6 shows the characteristics of a three cell battery operated over periods of several hours at low current densities (discharged against a 24.5 ohm load). The cells used for the performance of FIGS. 4, 5 and 6 all embodied the aluminum/trichloroisocyanuric acid couple although other couples based on aluminum or magnesium with trichloroisocyanuric acid or dibromodimethyl-hydantoin have proved equally effective.

On an energy density basis compact cells fitted with cathodes up to about 1.50 mm thick and coupled with various aluminum alloys are gravimetrically and volumetrically competitive with the magnesium/silver chloride system. The volumetric competitiveness principally arises because of the elimination of the free electrolyte space that normally exists in cells of the magnesium/silver chloride type where typically it is of the order of 1.00 mm, and the higher working voltages of the cell.

It will be appreciated that one of the objects of the present invention is to provide a cell design in which maximum utilization is made of the cathode reactant material. In cells of relatively small cross-sectional area- (up to for example 50 cm$^2$) adequate wetting of substantially the whole of the cathode reactant material 12 might take place with the provision of peripheral electrolyte access passageways 16 together with a suitably perforated anode without the need for providing additional electrolyte access passageways through the body of cathode reactant material portions 12a and 12b. It will be appreciated however that the volume of cathode reactant material is critical relative to the cell output and that accordingly the provision of internal electrolyte access passageways within the cathode reactant material would necessitate a correspondingly larger thickness of cathode reactant material.

Although the above specific embodiments have been directed to experiments with relatively small size cells as would be used for example in a reserve primary battery for use in sonobuoys, further experimentation has indicated that the general principles of the invention might be applied with equal effectiveness to larger area electrodes of for example up to 50.00 cm in diameter. In such instances the cathode reactant material is assembled in mosaic form on the current collector. By removing the need for free flowing electrolyte within the cell (conventionally across the planar face of the cathode reactant material) other than through the relatively narrow electrolyte access passageways, a considerable saving in bulk is possible which makes the metal/organo-halogen couple extremely attractive because of the very cheap supply of raw materials and the ease of manufacture of the cell.

The foregoing description is indicative of the principle of the invention and it will be apparent to the artisan skilled in the art that other variations or designs within that principle are possible.

I claim:

1. A cell of a water activated battery employing a metal/organo-halogen couple including an anode member and a cathode member comprising cathode reactant material, the anode and cathode members being of planar form with a porous insulating member sandwiched therebetween, the cell including at least one electrolyte access passageway extending at least part way into the thickness of the cathode reactant material to allow passage of the electrolyte to the central region of the cathode reactant material.

2. A cell of a water activated battery as claimed in claim 1 in which the at least one electrolyte passageway extends through the whole thickness of the cathode reactant material to provide at least two discrete spaced apart portions of said cathode reactant material with the electrolyte access passageway between them.

3. A cell of a water activated battery as claimed in claim 2 wherein the discrete portions are assembled in mosaic form with a network of interconnecting electrolyte access passageways extending across and throughout the cathode reactant material.

4. A cell of a water activated battery as claimed in claim 3 wherein the discrete portions of cathode reactant material are mounted upon or arranged in direct contact with a single current collector backing plate.

5. A cell of a water activated battery as claimed in claim 2 wherein the discrete portions of cathode reactant material are mounted upon or arranged in direct contact with a single current collector backing plate.

6. A cell of a water activated battery as claimed in claim 5 wherein the anode member is perforated to allow the porous insulating member to act as an electrolyte access passageway.

7. A cell of water activated battery as claimed in claim 1 wherein the anode member is perforated to allow the porous insulating member to act as an electrolyte access passageway.

8. A water activated battery comprising a plurality of cells according to claim 1 wherein the cells are arranged in sandwich form and electrolyte is admitted into the individual cells and the electrolyte access passageways therein via portways provided within the body of the battery casing.

* * * * *